United States Patent
Kanbayashi

(10) Patent No.: US 10,189,181 B2
(45) Date of Patent: Jan. 29, 2019

(54) METHOD FOR SLICING WORKPIECE AND PROCESSING LIQUID

(71) Applicant: SHIN-ETSU HANDOTAI CO., LTD., Tokyo (JP)

(72) Inventor: Keiichi Kanbayashi, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 0 days.

(21) Appl. No.: 15/124,245

(22) PCT Filed: Mar. 6, 2015

(86) PCT No.: PCT/JP2015/001214
§ 371 (c)(1),
(2) Date: Sep. 7, 2016

(87) PCT Pub. No.: WO2015/151408
PCT Pub. Date: Oct. 8, 2015

(65) Prior Publication Data
US 2017/0015019 A1    Jan. 19, 2017

(30) Foreign Application Priority Data

Apr. 3, 2014 (JP) .................................. 2014-077178

(51) Int. Cl.
*B28D 5/00* (2006.01)
*B24B 27/06* (2006.01)
(Continued)

(52) U.S. Cl.
CPC .......... *B28D 5/007* (2013.01); *B24B 27/0633* (2013.01); *B28D 5/045* (2013.01); *C09K 3/1463* (2013.01); *Y02P 70/179* (2015.11)

(58) Field of Classification Search
CPC .............. B23D 57/0007; B23D 57/003; B24B 27/0633; B24B 37/044; B28D 5/007;
(Continued)

(56) References Cited

U.S. PATENT DOCUMENTS 4,856,490 A * 8/1989 Kawase ............... B23D 61/185
125/18
5,489,557 A * 2/1996 Jolley ............... H01L 21/02052
134/28

(Continued)

FOREIGN PATENT DOCUMENTS

| CN | 101855045 A | 10/2010 |
|---|---|---|
| CN | 102179880 A | 9/2011 |

(Continued)

OTHER PUBLICATIONS

Dec. 8, 2016 Office Action issued in Taiwanese Patent Application No. 104107389.

(Continued)

*Primary Examiner* — Timothy V Eley
(74) *Attorney, Agent, or Firm* — Oliff PLC

(57) ABSTRACT

The present invention is a method for slicing a workpiece, including: forming a wire row by a wire spirally wound between a plurality of wire guides and traveling in an axial direction, and pressing a workpiece against the wire row while supplying a processing liquid containing abrasive grains to a contact portion between the workpiece and the wire, wherein a used portion of the abrasive grains are subjected to a treatment with a mixed liquid of sulfuric acid and hydrogen peroxide, and the abrasive grains subjected to the treatment are reused for the slicing of a workpiece. This makes it possible to slice a workpiece with suppressing (Continued)

contamination of a wafer with metal impurities when abrasive grains are reused in slicing a workpiece by use of a wire saw.

3 Claims, 2 Drawing Sheets

(51) Int. Cl.
*B28D 5/04* (2006.01)
*C09K 3/14* (2006.01)

(58) Field of Classification Search
CPC .......... B28D 5/042; B28D 5/045; C09G 1/02; C09G 1/04; C09K 3/1463; Y02P 70/179
See application file for complete search history.

(56) References Cited

U.S. PATENT DOCUMENTS

| | | | | |
|---|---|---|---|---|
| 5,647,989 | A * | 7/1997 | Hayashi | B01D 61/14 134/10 |
| 5,927,131 | A * | 7/1999 | Kiuchi | B21C 1/003 216/89 |
| 6,159,858 | A * | 12/2000 | Kishii | C03C 19/00 134/1.3 |
| 6,307,392 | B1 * | 10/2001 | Soejima | G01R 1/07342 257/735 |
| 7,223,344 | B2 * | 5/2007 | Zavattari | B23Q 11/1069 210/634 |
| 2002/0111024 | A1 * | 8/2002 | Small | C09G 1/02 438/689 |
| 2003/0041526 | A1 * | 3/2003 | Fujii | C09G 1/02 51/307 |
| 2004/0063227 | A1 | 4/2004 | Suzuki et al. | |
| 2004/0144722 | A1 * | 7/2004 | Zavattari | B23Q 11/1069 210/634 |
| 2008/0250723 | A1 * | 10/2008 | Fragiacomo | B01D 3/00 51/298 |
| 2009/0211167 | A1 | 8/2009 | Matagawa et al. | |
| 2010/0197202 | A1 * | 8/2010 | Branagan | B23D 61/185 451/36 |
| 2010/0258103 | A1 | 10/2010 | Kitagawa | |
| 2012/0027660 | A1 * | 2/2012 | Grabbe | B03D 1/02 423/348 |
| 2013/0149945 | A1 * | 6/2013 | Misra | B24B 37/042 451/540 |
| 2014/0331567 | A1 * | 11/2014 | Takahashi | B24B 57/02 51/298 |
| 2016/0265135 | A1 * | 9/2016 | Fujikata | C25D 21/08 |

FOREIGN PATENT DOCUMENTS

| | | |
|---|---|---|
| JP | H09-254145 A | 9/1997 |
| JP | H10-86140 A | 4/1998 |
| JP | 2002-519209 A | 7/2002 |
| JP | 2004-117354 A | 4/2004 |
| JP | 2005-057054 A | 3/2005 |
| JP | 2005-153035 A | 6/2005 |
| JP | 2007-207679 A | 8/2007 |
| JP | 2009-220269 A | 10/2009 |
| JP | 2011-016185 A | 1/2011 |
| WO | 00/001519 A1 | 1/2000 |

OTHER PUBLICATIONS

Feb. 14, 2017 Office Action issued in Japanese Patent Application No. 2014-077178.
Apr. 6, 2017 Office Action issued in Taiwanese Patent Application No. 104107389.
Apr. 27, 2017 Office Action issued in Chinese Patent Application No. 201580012652.X.
May 26, 2015 Search Report issued in International Patent Application No. PCT/JP2015/001214.
Oct. 4, 2016 International Preliminary Report on Patentability issued in International Patent Application PCT/JP2015/001214.
Oct. 11, 2016 Office Action issued in Japanese Patent Application No. 2014-077178.
Apr. 6, 2018 Office Action issued in Singaporean Application No. 11201607416Q.
Aug. 3, 2018 Office Action issued in Chinese Patent Application No. 201580012652.X.

* cited by examiner

METHOD FOR SLICING WORKPIECE AND PROCESSING LIQUID

TECHNICAL FIELD

The present invention relates to a method for slicing a workpiece by use of a wire saw and a processing liquid used therefor.

BACKGROUND ART

In recent years, an increase in size of a semiconductor wafer is demanded, and a wire saw apparatus is mainly used to slice a workpiece with this increase in size.

The wire saw apparatus is an apparatus that causes a wire (a high-tensile steel wire) to travel at a high speed, to which a workpiece (such as a silicon ingot) is pressed, to slice the workpiece while applying slurry thereto, thereby slicing the workpiece into many wafers at the same time (see Patent Document 1).

Here, an outline of an example of a conventional general wire saw is shown in FIG. 4.

As shown in FIG. 4, a wire saw 101 mainly includes a wire 102 for slicing a workpiece, wire guides 103 around which the wire 102 is wound, a tension-applying mechanism 104 for giving the wire 102 a tensile force, a workpiece-feeding mechanism 105 for feeding the workpiece to be sliced, and nozzles 106 for supplying a processing liquid (slurry) in which abrasive grains are dispersed and mixed into coolant at the time of slicing.

The wire 102 is unreeled from one wire reel bobbin 107 and reaches the wire guides 103 via the tension-applying mechanism 104 composed of a powder clutch (a constant torque motor 109), a dancer roller (a dead weight) (not shown) and the like through a traverser 108. The wire 102 is wound around this wire guides 103 for approximately 300 to 400 turns, and then taken up by a wire reel bobbin 107' via the other tension-applying mechanism 104'.

Moreover, each of the wire guides 103 is a roller that has a steel cylinder of which a polyurethane resin is press fitted in the periphery and that has grooves formed at a fixed pitch on a surface thereof. The wound wire 102 can be driven in a reciprocating direction for a predetermined cycle by a driving motor 110.

Moreover, nozzles 106 are provided near the wire guides 103 and the wound wire 102, and the slurry can be supplied to the wire guides 103 and the wire 102 from this nozzle 106 at the time of slicing. This slurry is exhausted as waste slurry after the slicing.

With the wire saw 101, an appropriate tension is applied to the wire 102 with a tension-applying mechanism 104, the wire 102 is caused to travel in a reciprocating direction with the driving motor 110, and a workpiece is sliced while supplying slurry, whereby a desired sliced wafer is obtained.

In slicing a workpiece with a wire saw apparatus as described above, it has been proposed to repeatedly use (reuse) abrasive grains used in this slicing of a workpiece to reduce the cost for manufacturing wafers (Patent Document 2).

CITATION LIST

Patent Literature

Patent Document 1: Japanese Unexamined Patent publication No. H10-86140

Patent Document 2: Japanese Unexamined Patent publication No. 2002-519209

SUMMARY OF INVENTION

Problem to be Solved by the Invention

Previously, it has been known that metal impurities on the surface or in the interior of a semiconductor wafer particularly a silicon wafer exert large influence on properties of various semiconductor device to which the wafer is used. In view of an influence on semiconductor devices, it is desirable that the contamination of wafers with metal impurities is as little as possible. An example of metal impurities that can be a contamination source include copper.

As a method to prevent such contamination of a wafer with metal impurities, it is important not to contact the wafer with metal that can be a contamination source.

In a wire used for slicing a workpiece by use of a wire saw, the surface is usually plated with brass.

In the foregoing wire saw apparatus, the wire itself is scraped to a fine wire when slicing a workpiece, thereby causing elution of copper, which is a metal impurity contained in the brass plating, into slurry. This copper adheres to abrasive grains in the slurry and remains in used abrasive grains. Accordingly, large amount of copper is detected in used abrasive grains compared to unused new abrasive grains.

As described above, when a workpiece is sliced with reusing used abrasive grains containing large amount of copper, large amount of copper is contained in the system, which enlarges an occasion of a wafer coming into contact with copper. Accordingly, it is supposed that larger amount of copper is apt to be introduced into a sliced wafer.

The present invention was accomplished in view of the above-described problems. It is an object of the present invention to provide a method for slicing a workpiece which can suppress the contamination of a wafer with metal impurities when reusing abrasive grains in slicing a workpiece by use of a wire saw apparatus.

Means for Solving Problem

To solve the problems, the present invention provides a method for slicing a workpiece, comprising:

forming a wire row by a wire spirally wound between a plurality of wire guides and traveling in an axial direction, and pressing a workpiece against the wire row while supplying a processing liquid containing abrasive grains to a contact portion between the workpiece and the wire, wherein a used portion of the abrasive grains are subjected to a treatment with a mixed liquid of sulfuric acid and hydrogen peroxide, and the abrasive grains subjected to the treatment are reused for the slicing of a workpiece.

Such a method for slicing a workpiece can suppress contamination with metal impurities in a wafer obtained after slicing a workpiece even when reused abrasive grains are used, and can produce a high-purity wafer having low contamination with metal impurities at low cost.

The present invention also provides a processing liquid, comprising abrasive grains to be reused after being used for slicing a workpiece by use of a wire saw, wherein a concentration of copper contained in the abrasive grains is 1 ppm or less per 1 g of the abrasive grains.

Such a processing liquid can lower an occasion of contact between a wafer and copper, although it contains abrasive grains being reused, and can reduce the production cost of a wafer.

Effect of Invention

The inventive method for slicing a workpiece can suppress contamination with metal impurities in a wafer obtained after slicing a workpiece, although it reuses used abrasive grains, and can produce a high-purity wafer having low contamination with metal impurities at low cost. The inventive processing liquid can lower an occasion of contact between a wafer and copper, although it contains recycled abrasive grains, and can reduce the production cost of a wafer.

DESCRIPTION OF EMBODIMENTS

Hereinafter, embodiments of the present invention will be described, but the present invention is not limited thereto.

As described above, in reusing of abrasive grains used for slicing a workpiece, there has been a problem of contamination of a wafer with metal, since the abrasive grains are contaminated with metals due to a wire, etc., to degrade the quality.

Accordingly, the present inventors have specifically investigated to solve such problems, and consequently have conceived that when reusing abrasive grains used for slicing a workpiece, it is possible to suppress contamination of a wafer with metal impurities by treating the used abrasive grains with a mixed liquid of sulfuric acid and hydrogen peroxide; thereby completing the present invention.

Figure 1:
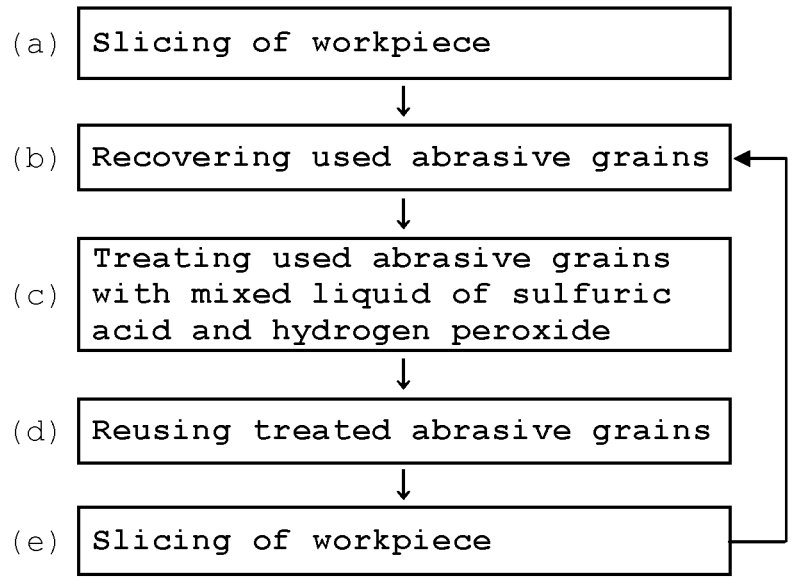
FIG. 1 is a flowchart to show an example of the method for slicing a workpiece of the present invention.

Hereinafter, the inventive method for slicing a workpiece is described with referring to a flowchart of FIG. 1.

An embodiment of the inventive method for slicing a workpiece include the following steps: (a) performing the first slicing of a workpiece, (b) recovering used abrasive grains exhausted in Step (a), (c) treating the used abrasive grains with a mixed liquid of sulfuric acid and hydrogen peroxide, (d) reusing the treated abrasive grains obtained in Step (c), and (e) performing the second slicing of a workpiece. As shown in FIG. 1, the used abrasive grains exhausted in Step (e) can also be reused by repeating Step (b) to Step (e).

Figure 4:
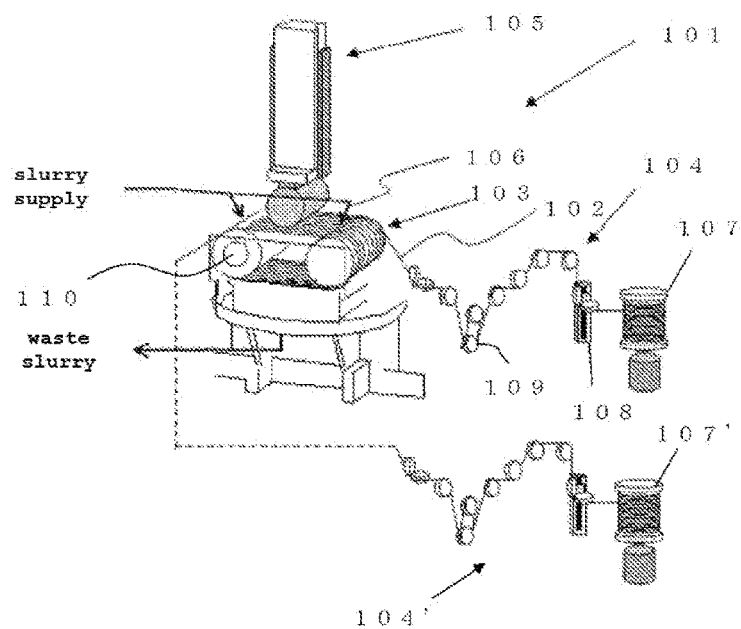
FIG. 4 is a schematic diagram to show an example of an usual wire saw.

In Step (a), it is possible to slice a workpiece by use of a wire saw 101 as shown in FIG. 4, for example.

In this wire saw 101, a workpiece is sliced by a wire 102 while supplying slurry containing abrasive grains from nozzles 106. The slurry used for slicing a workpiece is exhausted as waste slurry.

The workpiece can be appropriately selected depending on the material of a wafer to be produced, including an ingot composed of silicon, glass, ceramics, and so on, for example.

Illustrative examples of the abrasive grain, although it is not particularly limited, include silicon carbide, which is generally used for a wire saw.

As the wire, the one in which the surface is plated with brass is commonly used. This brass plating is frequently applied in a process for wiredrawing a wire rod, which is a row material of a wire, to process into the wire with a finer prescribed diameter.

In Step (b), used abrasive grains are recovered from the waste slurry containing thereof exhausted from a wire saw.

Illustrative examples of the method for recovering this used abrasive grains include a method in which the waste slurry used for slicing a workpiece is put into a centrifuge to centrifuge abrasive grains from a coolant of the waste slurry.

In this used abrasive grains, silicon, iron, and copper are contained other than silicon carbide, which is a main ingredient. The silicon is generated as kerf loss when a workpiece (silicon ingot) is sliced. The iron and the copper are generated in a scraped amount during a process in which a wire is worn to finer together with slicing a workpiece. The copper and the iron are eluted from brass plating on the surface of the wire and an iron wire portion in the wire respectively.

When the used abrasive grains are analyzed, copper is usually detected in a concentration of 100 times or more compared to unused new abrasive grains.

Illustrative examples of the foregoing analysis method include a method in which 5 g of a used abrasive grain sample is extracted with 50 cc of a mixed acid (mixed liquid of hydrofluoric acid and nitric acid) for 3 hours, and then diluted to 10 times, followed by performing ICP-OES measurement (Inductively Coupled Plasma Optical Emission Spectrometry).

In Step (c), the used abrasive grains are treated with a mixed liquid of sulfuric acid and hydrogen peroxide in order to remove copper, which is a metal impurity in the used abrasive grains obtained in Step (b).

Previously, in order to remove the silicon and the iron from the used abrasive grains, it has been performed each treatment of sodium hydroxide and sulfuric acid respectively. However, this is insufficient to remove the copper, and is an inappropriate method for removing copper since large amount of copper remains in the used abrasive grains even when each treatment with sodium hydroxide and sulfuric acid is performed by the foregoing method.

The present invention performs a treatment with a mixed liquid of sulfuric acid and hydrogen peroxide as a method to dissolve copper. This is because hydrogen peroxide, which has standard potential higher than copper in the presence of sulfuric acid, is suitable for dissolving copper.

In this case, the mixing ratio of sulfuric acid and hydrogen peroxide is not particularly limited. For example, it is possible to use a mixed liquid containing 123 g of 75% sulfuric acid and 27 g of 30% hydrogen peroxide.

By treating used abrasive grains with such a mixed liquid, it is possible to obtain abrasive grains with a low concentration of remaining copper.

As the specific treatment condition, it can be mentioned a condition in which 10 g of used abrasive grains are stirred with the foregoing mixed liquid, and subsequently filtrated and washed with pure water, and then dried. In this condition, the temperature can be set to 25° C. and the treatment time can be set to 24 hours when treating with the mixed liquid.

By the foregoing treatment, the copper concentration in used abrasive grains comes to be equal to or less than the value before the usage, for example, 1 ppm or less. This can lowers the occasion of a contact between a wafer and copper when it is reused as a processing liquid for slicing a workpiece as will be described later.

It is to be noted that, in the present invention, the foregoing treatment is performed with the aim of reducing a concentration of copper, which is a metal impurity exerting particularly bad influence on a wafer. However, it can be expected that the abrasive grains subjected to such a treatment achieve an effect to reduce the concentrations of other kinds of metal impurities such as sodium, magnesium, aluminum, chromium, iron, nickel, and zinc when it is reused for slicing a workpiece.

In Step (d), the treated abrasive grains obtained in Step (c) is reused. Specifically, the treated abrasive grains are dispersed into coolant to make a processing liquid (slurry).

As the coolant, it is possible to use the same type as a coolant in slurry used for Step (a), although it is not particularly limited so long as it is used for slurry of a wire saw. Illustrative examples thereof include a glycol base disperse medium.

Such a processing liquid can lower the occasion of a contact between a wafer and copper in reusing, can reduce the cost of the slurry since it is reused, and as a result, the production cost of a wafer can be reduced.

In Step (e), slicing of a workpiece is performed by using slurry obtained in Step (d). This step is basically the same as Step (a), and it is possible to use the same apparatus as the wire saw used in Step (a) again.

The used abrasive grains in this waste slurry exhausted in Step (e) can also be subjected to recovering of Step (b), a treatment of Step (c), and reusing of Step (d) likewise Step (a), and can be used for slicing a workpiece again. In this case, new abrasive grains can be supplied to cover the deficiency of the abrasive grains and used after being mixed with reused portions as a matter of course.

Such a method for slicing a workpiece can suppress contamination with metal impurities in a wafer obtained after slicing a workpiece, although it reuses used abrasive grains, and can produce a high-purity wafer having low contamination with metal impurities at low cost.

EXAMPLE

Hereinafter, the present invention will be more specifically described with referring to Experiment, Examples, and Comparative Examples, but the present invention is not limited to thereto.

Experiment

After slicing a silicon ingot having a diameter of 300 mm by using #2000 abrasive grains, 5 g of a sample of the used abrasive grains was extracted with 50 cc of a mixed acid (mixed liquid of hydrofluoric acid and nitric acid) for 3 hours, and subsequently diluted to 10 times, and then subjected to ICP-OES measurement. As the result of the analysis performed by this method, the copper concentration in 1 g of the abrasive grains was 143.000 ppm in the used abrasive grains as against 1.87 ppm in unused new abrasive grains.

Example 1

The used abrasive gains obtained in Experiment were treated with a mixed liquid of sulfuric acid and hydrogen peroxide and analyzed. As the treatment, 10 g of the used abrasive gains was stirred with a liquid in which 123 g of 75% sulfuric acid and 27 g of 30% hydrogen peroxide had been mixed, and subsequently filtrated, washed with pure water, and then dried. The treatment with the mixed liquid was performed at a temperature of 25° C. for a treating time of 24 hours. As in the analytical method described above, 5 g of a sample of the used abrasive grains was extracted with 50 cc of a mixed acid (mixed liquid of hydrofluoric acid and nitric acid) for 3 hours, and subsequently diluted to 10 times, and then subjected to ICP-OES measurement.

Figure 2:
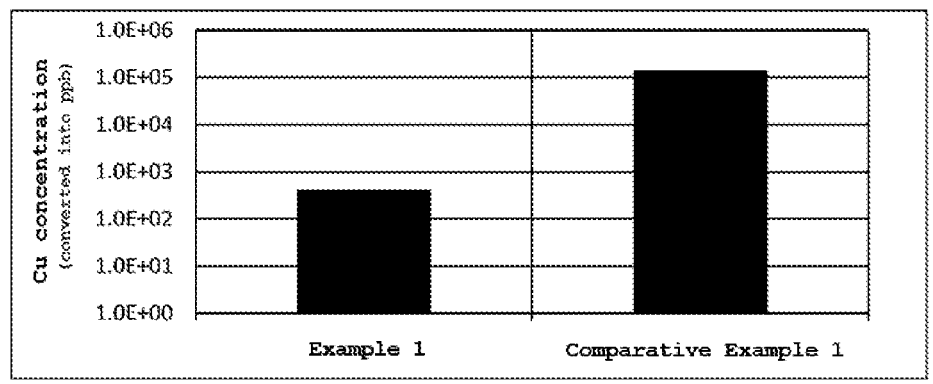
FIG. 2 is a graph to show each copper concentration per 1 g of abrasive grains in Example 1 and Comparative Example 1.

The abrasive grains subjected to the foregoing treatment was analyzed as in Experiment. As the result, the copper concentration contained in 1 g of the abrasive grains was 0.42 ppm, which was reduced to a level of a three-hundredth part of abrasive grains before the treatment. The result is shown in FIG. 2.

Comparative Example 1

The used abrasive gains obtained in Experiment were subjected to each treatment with sodium hydroxide and sulfuric acid, which is a conventional method, and analyzed as in Experiment and Example. As the result, the copper concentration contained in 1 g of the abrasive grains was 141.34 ppm, which was not changed from the value before the treatment. The result is shown in FIG. 2.

It has revealed that the used abrasive grain treated with a mixed liquid of sulfuric acid and hydrogen peroxide in Example 1 can reduce the copper concentration to a level equivalent to or lower than that of new abrasive grains, since the copper concentration of the unused new abrasive grains was 1.87 ppm. Moreover, it has revealed that a significant difference of the copper concentration can be observed between each of the treated abrasive grains obtained by Example 1 and Comparative Example 1 as shown in FIG. 2.

Example 2

In order to confirm the influence of copper contained in abrasive grains exerted on the copper concentration in a sliced wafer, a silicon ingot having a diameter of 300 mm was sliced by using treated abrasive grains obtained in Example 1. In the slicing, unused new coolant and a wire having the surface without plating were prepared and used as the coolant to be mixed with the abrasive grains and the wire respectively.

Comparative Example 2

A silicon ingot was sliced as in Example 2 by using treated abrasive grains obtained in Comparative Example 1.

Each of the wafers obtained by Example 2 and Comparative Example 2 was analyzed as follows.

As the analytical samples, two pieces of wafers (sample 1 and sample 2) were sampled from plural wafers obtained by slicing one workpiece. Each surface of 50 pm of the obtained wafers was etched off, and then three test pieces were cut out from each wafer to give 6 samples in total. The test pieces were cut out from the vicinity of the central part of the wafers. On the collected samples, the concentrations of metal impurities were analyzed by ICP-MS measurement (Inductively Coupled Plasma Mass Spectrometry) by complete dissolution method to quantified the concentrations of copper, sodium, magnesium, aluminum, chromium, iron, nickel, and zinc contained in each wafer. The results are shown in FIG. 3.

Figure 3:
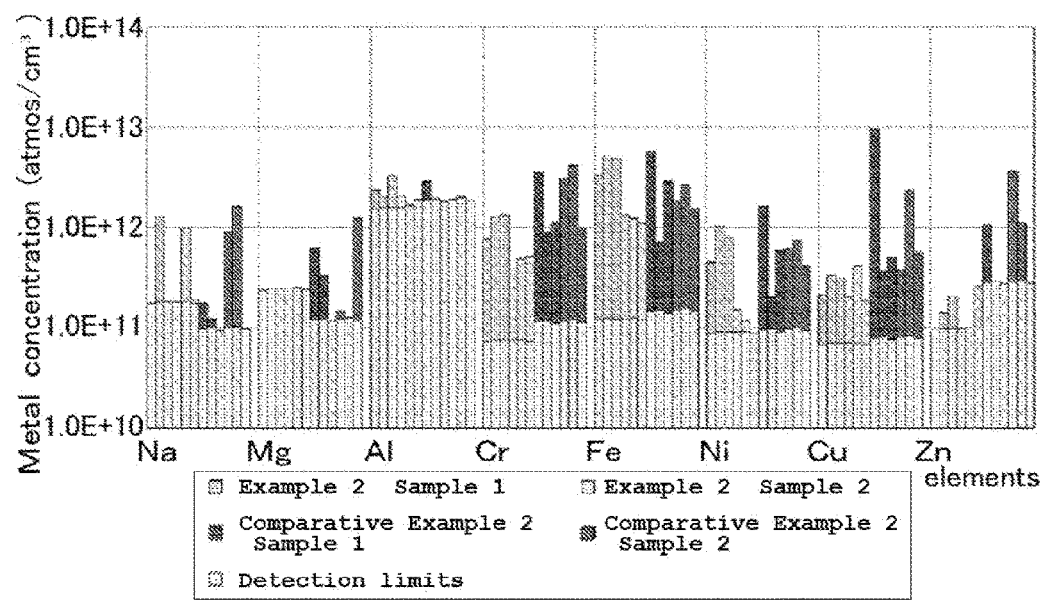
FIG. 3 is a graph to show each concentration of various metals in wafers obtained by Example 2 and Comparative Example 2.

On the measurements of the copper concentration in a wafer obtained by Comparative Example 2, copper concentrations of $9.49E+12$ atoms/cm$^3$ at the maximum and $3.61E+11$ atoms/cm$^3$ at the minimum were detected as shown in FIG. 3.

On the other hand, when measuring the copper concentration in a wafer obtained by Example 2, copper concentrations of $4.14E+11$ atoms/cm$^3$ at the maximum and $1.85E+11$ atoms/cm$^3$ at the minimum were detected as shown in FIG. 3.

On comparison of the both copper concentrations in sliced wafers, the maximum value was a twenty-second part or less and the minimum value was a half or less in Example 2 compared to Comparative Example 2, which has revealed that the copper concentration can be reduced.

Moreover, it has revealed that the concentrations can be reduced in Example 2 equivalent to or lower than those of Comparative Example 2 on the metals other than copper, that is, sodium, magnesium, aluminum, chromium, iron, nickel, and zinc as shown in FIG. 3.

From the foregoing results, it has revealed that the inventive method for slicing a workpiece can suppress contamination with metal impurities in a wafer obtained after slicing a workpiece, although it reuses used abrasive grains, and can produce a high-purity wafer having low contamination with metal impurities at low cost.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method for slicing workpieces, comprising:
   forming a wire row by a wire spirally wound between a plurality of wire guides and traveling in an axial direction,
   pressing a workpiece against the wire row while supplying a processing liquid comprising abrasive grains to a contact portion between the workpiece and the wire to slice the workpiece and thereby producing a waste slurry comprising at least a portion of the abrasive grains,
   recovering at least a portion of the abrasive grains from the waste slurry,
   subjecting the recovered abrasive grains to a treatment with a mixed liquid of sulfuric acid and hydrogen peroxide,
   dispersing the treated abrasive grains into coolant to make a reused processing liquid, and
   reusing the treated abrasive grains in the reused processing liquid for slicing of another workpiece.

2. The method of claim 1, wherein
   a concentration of copper contained in the treated abrasive grains is 1 ppm or less per 1 g of the treated abrasive grains.

3. The method of claim 1, wherein the subjecting the recovered abrasive grains to the treatment with the mixed liquid of sulfuric acid and hydrogen peroxide removes copper from the recovered abrasive grains.

* * * * *